H. M. & T. J. DEETH.
VEHICLE WHEEL TIRE.
APPLICATION FILED JUNE 13, 1908.

935,093.

Patented Sept. 28, 1909.
3 SHEETS—SHEET 1.

Witnesses.

Inventors.
Herbert M Deeth
Thomas J Deeth.

H. M. & T. J. DEETH.
VEHICLE WHEEL TIRE.
APPLICATION FILED JUNE 13, 1908.

935,093.

Patented Sept. 28, 1909.
3 SHEETS—SHEET 2.

Witnesses.

Inventors.

H. M. & T. J. DEETH.
VEHICLE WHEEL TIRE.
APPLICATION FILED JUNE 13, 1908.

935,093.

Patented Sept. 28, 1909.
3 SHEETS—SHEET 3.

Witnesses
C. E. Smith.
L. F. Brock

Inventors
Herbert M. Deeth
Thomas J. Deeth
By
Their Attorney

UNITED STATES PATENT OFFICE.

HERBERT MILTON DEETH AND THOMAS JOHN DEETH, OF TORONTO, ONTARIO, CANADA.

VEHICLE-WHEEL TIRE.

935,093.

Specification of Letters Patent.   Patented Sept. 28, 1909.

Application filed June 13, 1908.   Serial No. 438,288.

*To all whom it may concern:*

Be it known that we, HERBERT MILTON DEETH and THOMAS JOHN DEETH, of the city of Toronto, in the county of York and Province of Ontario, Dominion of Canada, have invented certain new and useful Improvements in Vehicle-Wheel Tires; and we hereby declare the following is a full, clear, and exact description of the same.

This invention relates to a tire for a vehicle wheel comprising in its construction an annular resilient tread preferably rubber inclosed by a tire cover, and seated upon a resilient and extensible cushion expanded against the latter by an expansion means regulated by adjusting devices to increase or decrease the resiliency of the tire and regulate it to correspond with the resistance which is required to offer to the compression caused by the vehicle.

For an understanding of the invention reference is to be had to the following description and to the accompanying drawings in which:—

Figure 1:
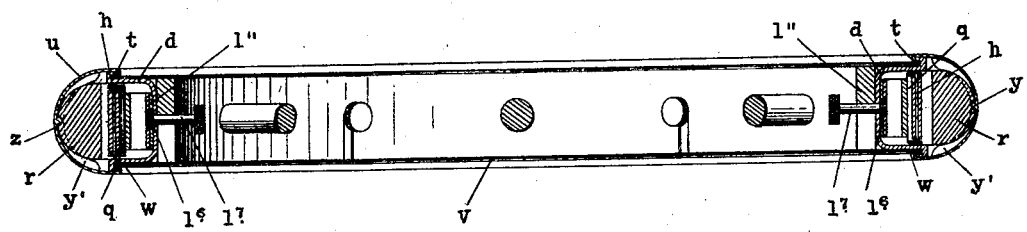
Figure 5:
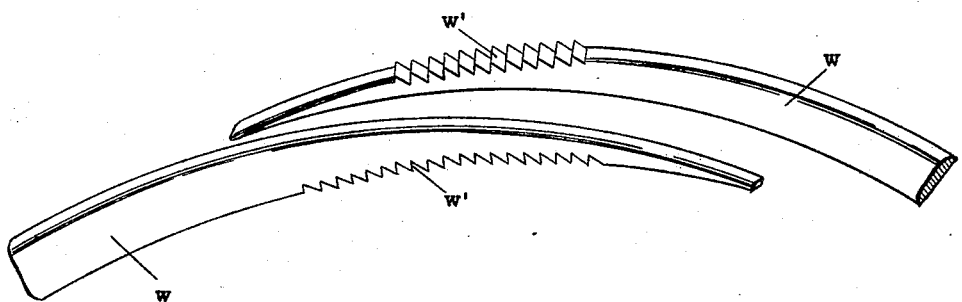
Figure 3:
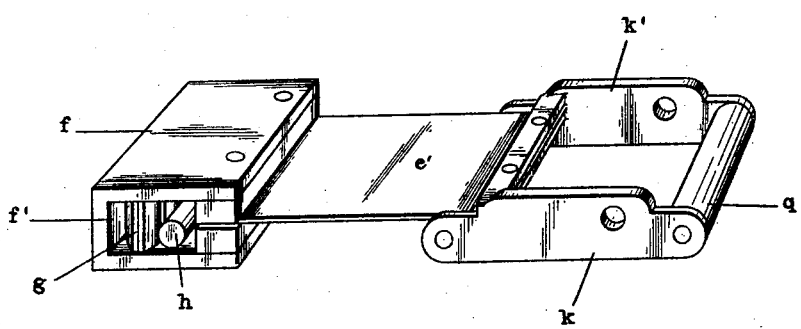
Figure 2:
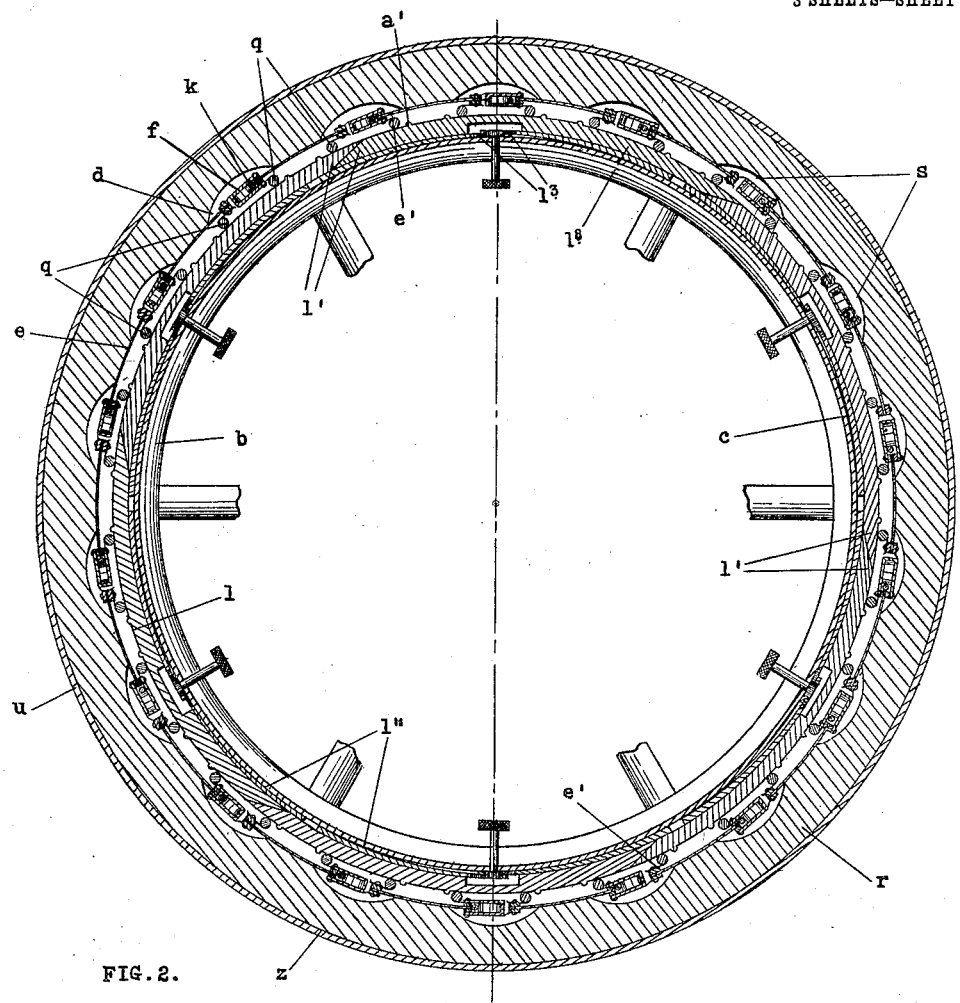
Figure 4:
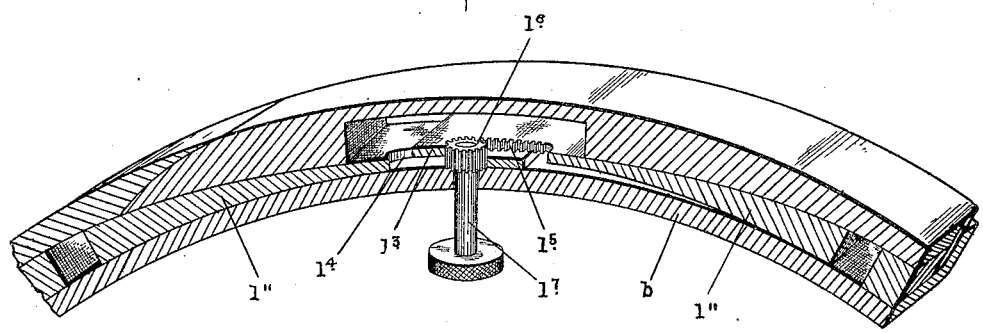
Figure 6:
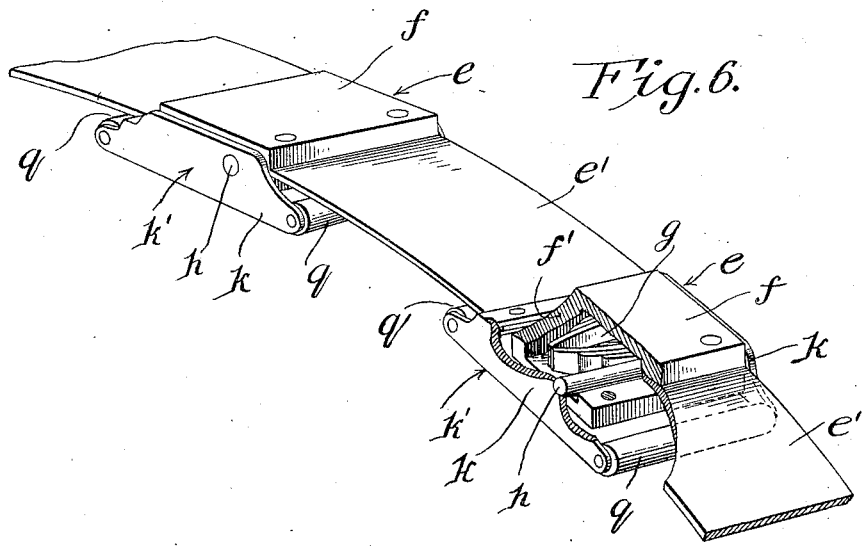
Figure 7:
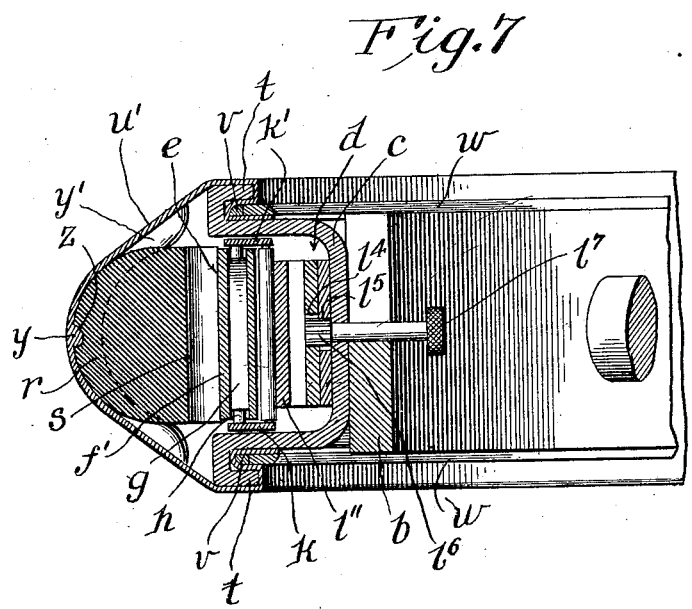

Figure 1, is a cross section of a vehicle wheel and tire. Fig. 2, is a sectional side elevation of the same vehicle wheel and tire as shown in Fig. 1. Fig. 3, is a perspective view of one of the yielding sections or links of the extensible cushion. Fig. 4, is a view of a portion of the expansion ring and the means for effecting the expansion and contraction of the latter. Fig. 5, is a view of a part of the extensible clamping band employed to secure the tire cover to the rim. Fig. 6 is a detail view showing two sections of the extensible cushion coupled together. Fig. 7 is a cross section of the tire similar to the showing of Fig. 1, but on a larger scale.

Like characters of reference refer to like parts throughout the specification and drawings.

Surrounding the wheel rim $b$ and rigidly attached thereto is a tire rim $c$ having a peripheral channel $d$, and contained in the peripheral channel $d$ is an annular resilient and extensible cushion $e$. The cushion $e$ is constructed of flexible links or sections $e'$ each having at one of its ends a chambered coupling member $f$ and at its other end a bifurcated coupling member $k'$ the arms $k$ of which embrace the chambered coupling member of the adjoining link or section. Contained in the chambered coupling member $f$ is a coupling pin $h$ having limited motion lengthwise of the chambered coupling member and interposed between the coupling pin $h$ and the outer end of the chamber $f'$ is a spring $g$ to yieldingly resist the motion of the coupling pin. The normal action of the springs $g$ is to effect the contraction of the cushion $e$ by pressing the chambered coupling member $f$ of each link or section $e'$ in the direction of the adjacent end of the next link or section, and to resistingly permit of the expansion of the annular cushion $e$ by allowing the chambered coupling member $f$, of each link or section to move in the opposite direction when the expansive pressure is applied. The movement of each link or section is limited during such expansion or contraction by the inner end of the chamber $f'$ and the compressed spring.

Interposed between the annular cushion $e$ and the inner surface of the peripheral channel $d$ is an expansion ring $l$ consisting of a number of segmental sections $l^8$. The ends of the inner face of each segmental section are provided with inclined wedge members $l'$ and engaging with the wedge members $l'$ are oppositely inclined movable wedge members $l''$ having overlapping ends $l^3$ formed with elongated slots $l^4$. The one face of each slot is provided with a rack $l^5$ with which engages a pinion $l^6$ mounted on a revoluble spindle $l^7$ extending through the wheel rim $b$, the racks $l^5$ being on opposite sides of the slots $l^4$. During the revolution of the pinion $l^6$ the racks are moved to draw the movable wedge members together or separate them so that they will by their engagement with the wedge members $l'$ respectively effect the outward expansion or inward contraction of the segmental sections. By means of this construction the segmental sections can be pressed outwardly to expand the annular cushion from or permit it to move inwardly toward the wheel rim.

Encircling the annular cushion $e$ is a resilient tread $r$ preferably of rubber or the like having at intervals on its inner periphery bridges $s$ to span the joints between the links or sections $e'$. The bridges are adapted to bear upon the middle portion of the links or sections and transmit the pressure or shock to them. The links or sections being of a flexible character, yield under the influence of such pressure or shock and cushion it, and bend inward, and the inward movement of the links or sections receiving the pressure or shock draws upon the other links or sections and causes the compression of the springs $g$ which absorb the pressure or shock as their compression is effected. To facilitate the free action of the links or sections during the compression of the springs $g$, rollers $q$ are journaled in the arms $k$ of each coupling member, and these rollers are arranged transversely to the circumference of the annular cushion and engage with the expansion ring $l$ so that all the links or sections can move unitedly, or each link or section can move independently of the others under the influence of the pressure or shock. The side faces of the tire rim $c$ are provided with grooved flanges $t$ to be engaged by annular washer rings $v$, and extensible clamping bands $w$. Each extensible clamping band $w$ is divided and has its ends beveled and provided with ratchet teeth $w'$ to interlock and hold the clamping ring in its extended or contracted condition. When the tire cover $u$ is placed on the tire rim $c$ its edges overhang the grooved flanges $t$, so that the washer rings $v$, and the extensible clamping bands $w$ can clamp it against the side faces of the tire rim, and the grooved flanges, when the ratchet teeth $w'$ are interlocked.

The inner surface of the tire cover $u$ is formed with a central annular rib $y$ which engages a circumferential groove $z$, and with transverse ribs $y'$ which engage in transverse grooves in the resilient tread $r$. The engagement of the rib $y$ in the groove $z$ prevents the side or lateral movement of the resilient tread and the creeping movement of the tread is prevented by the engagement of the transverse ribs $y'$ in the transverse grooves, the creeping movement of the cushion $e$ being prevented by stops $a'$ formed on the segments of the expansion ring $l$ which engage with and limit the circumferential movement of the rollers $q$ and through the agency of the latter, retard the creeping motion of the links or sections $e'$.

Having thus fully described our invention what we claim as new and desire to secure by Letters Patent is:—

1. A tire for a vehicle wheel comprising a tire rim having a peripheral channel, an annular resilient tread to be held in the peripheral channel, a tire cover to inclose the resilient tread, a resilient extensible cushion to yieldingly support the resilient tread, comprising flexible sections, a chambered coupling member for one end of each section, a coupling member for the other end of each section having bifurcated arms to receive the chambered coupling member of the next adjoining section, a coupling pin in the chambered coupling member having its ends journaled in the arms of the bifurcated coupling member of the next section, a spring in the chambered coupling member to resistingly permit of a limited movement of the coupling pin and normally hold the resilient extensible cushion in its contracted position, adjustable means for expanding the resilient extensible cushion against the resilient tread, other means for attaching the tire cover to the tire rim, means to prevent shifting of the tire cover on the annular resilient tread, and means to prevent the creeping of the resilient extensible cushion around the tire rim.

2. A tire for a vehicle wheel comprising a tire rim having a peripheral channel, an annular resilient tread to be held in the peripheral channel, a tire cover to inclose the resilient tread, a resilient extensible cushion in the channel of the tire rim to support the resilient tread, comprising flexible sections, a chambered coupling member for one end of each section, a coupling member for the other end of each section having bifurcated arms to receive the chambered coupling member of the next adjoining section, a coupling pin in the chambered coupling member, having its ends journaled in the arms of the bifurcated coupling member of the next section, a spring in the chambered coupling member to resistingly permit of a limited movement of the coupling pin in the chambered coupling member, and normally hold the resilient extensible member in its contracted position, rollers journaled in the arms of the bifurcated coupling member on the inner side of, and transversely to the circumference of the resilient cushion, an expansion ring in the peripheral channel of the tire rim to contact the rollers comprising a number of segments with inclined wedge members on their inner faces, oppositely inclined wedge members with overlapping ends, to engage the first mentioned wedge members and bear on the inner periphery of the peripheral channel of the tire rim, slots in the overlapping ends of the oppositely inclined wedge members, racks for the slots, pinions to operate in the racks to actuate the inclined wedge members to expand the expansion ring, against the resilient extensible cushion and force the resilient tread against the tire cover, ribs on the expansion ring transversely to the circumference thereof to contact the rollers, and limit the travel of the annular resilient cushion on the expansion ring, bridges on the inner periphery of the resilient tread to bridge the coupling members of the resilient extensible cushion, means for attaching the tire cover to the tire rim, and means to prevent the tire cover shifting on the resilient tread.

3. A tire for a vehicle wheel comprising a tire rim having a peripheral channel, an annular resilient tread to be held in the peripheral channel, a resilient extensible cushion for the annular resilient tread, a tire cover to inclose the resilient tread, annular grooved flanges on the side faces of the tire rim to receive the edges of the tire cover, extensible clamping bands to fit in the grooved flanges and hold the edges of the tire against the side faces of the tire rim, an expansion ring to expand the resilient extensible cushion to force the resilient tread against the tire cover, means for operating the expansion ring, other means to prevent the shifting of the tire cover on the annular resilient tread, and means for controlling the resilience of the resilient extensible cushion.

4. A tire for a vehicle wheel comprising a tire rim having a peripheral channel, an annular resilient tread to be held in the peripheral channel, having a peripheral groove and grooves transverse to the peripheral groove, a resilient extensible cushion for the annular resilient tread, a tire cover for the resilient tread, an expansion band to expand the resilient extensible cushion to force the resilient tread against the tire cover, means for operating the expansion band, an annular rib on the inside circumference of the tire cover in the peripheral groove and transverse ribs on the inside surface of the tire cover to engage in the transverse grooves, of the resilient tread to prevent the tire cover shifting on the annular resilient tread, means for attaching the tire cover to the tire rim, and means for controlling the resilience of the resilient extensible cushion.

5. A tire for a vehicle wheel comprising a resilient extensible cushion having a number of independent flexible sections, a chambered coupling member for one end of each section, a coupling member for the other end of each section having bifurcated arms to receive the chambered end of the next adjoining section, a coupling pin in the chambered coupling member having its ends journaled in the arms of the bifurcated coupling member of the next section, a spring in the chambered coupling member to resistingly permit of a limited movement of the coupling pin and normally hold the resilient extensible cushion in its contracted position.

6. A tire for a vehicle wheel comprising a resilient extensible cushion having a number of independent flexible sections, a chambered coupling member for one end of each section, a coupling member for the other end of each section having bifurcated arms to receive the chambered end of the next adjoining section, a coupling pin in the chambered coupling member having its ends journaled in the arms of the bifurcated coupling member of the next section, a spring in the chambered coupling member to resistingly permit of a limited movement of the coupling pin and normally hold the resilient extensible cushion in its contracted position and rollers transversely to the length of the resilient extensible cushion, journaled in the arms of the bifurcated coupling member on either side of the chambered coupling member of the next section.

Toronto, June 1st., A. D. 1908.

HERBERT MILTON DEETH.
THOMAS JOHN DEETH.

Signed in the presence of—
C. H. RICHES,
N. R. ROBERTSON.